July 14, 1936. E. D. BOYLE 2,047,356
APPARATUS FOR MOLDING MATERIAL
Filed Aug. 9, 1933 2 Sheets-Sheet 2
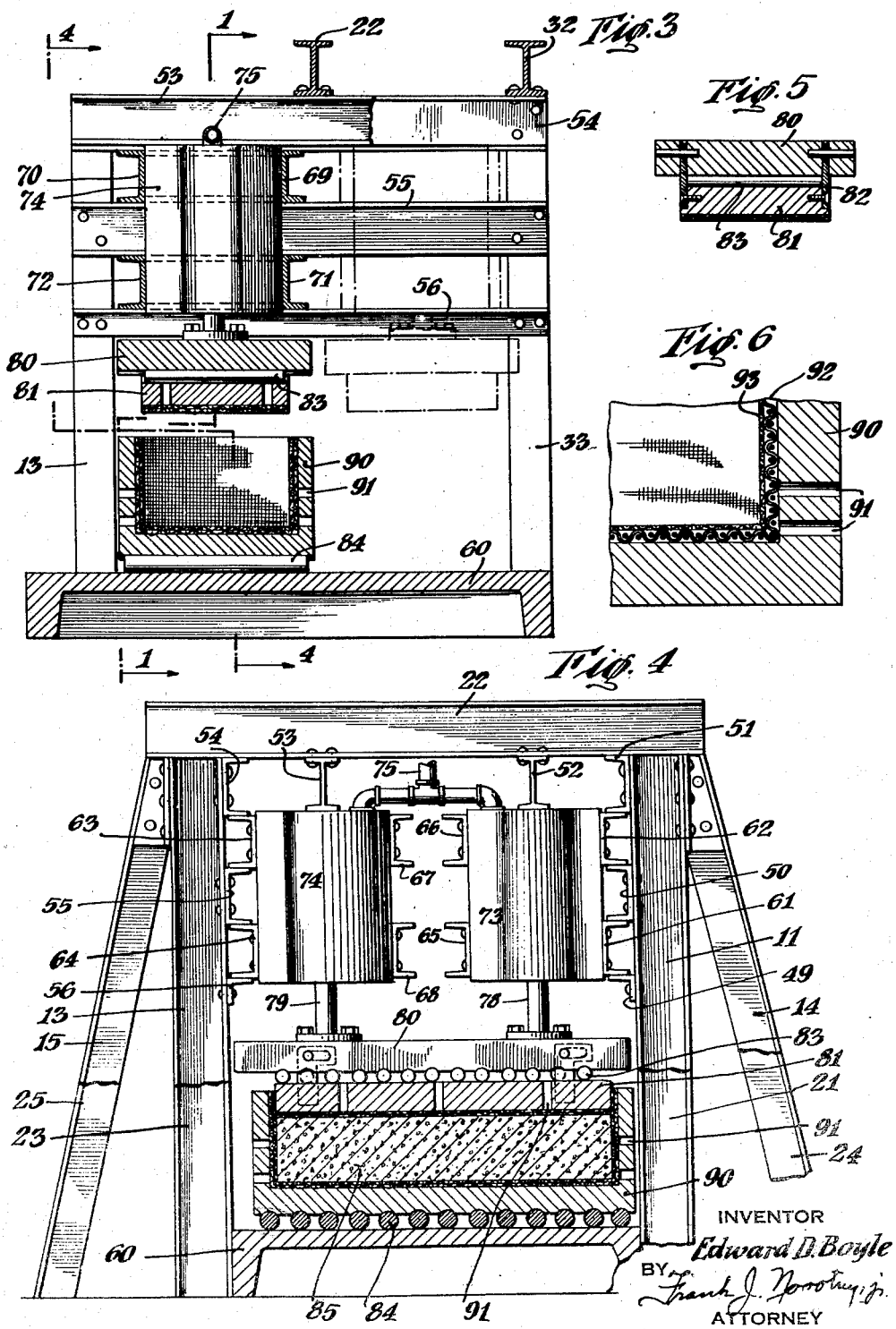

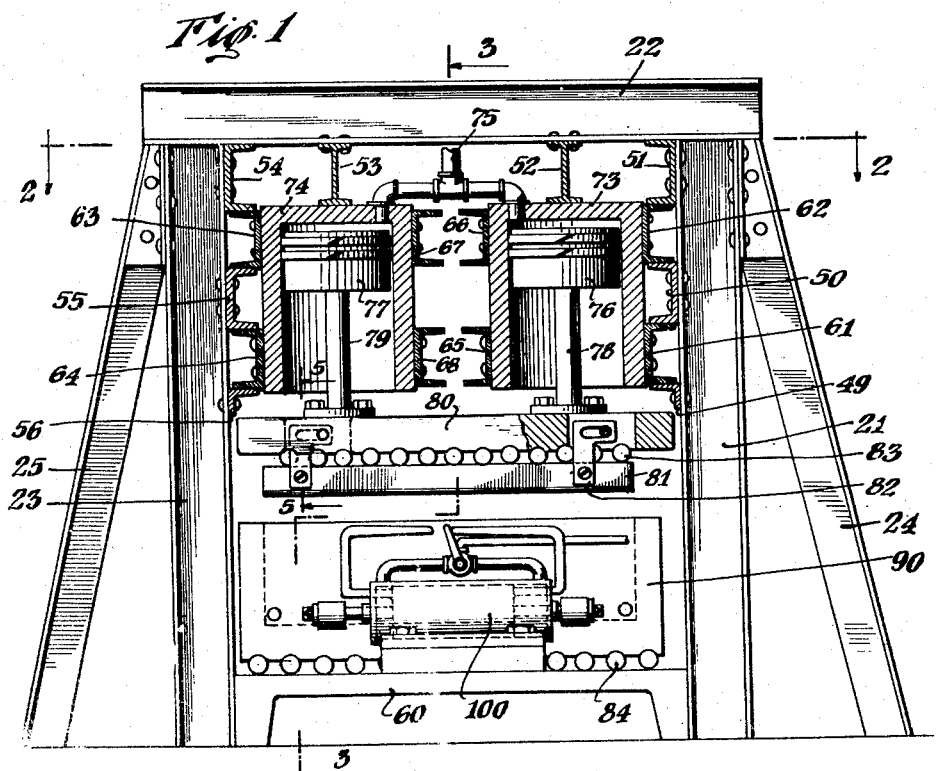
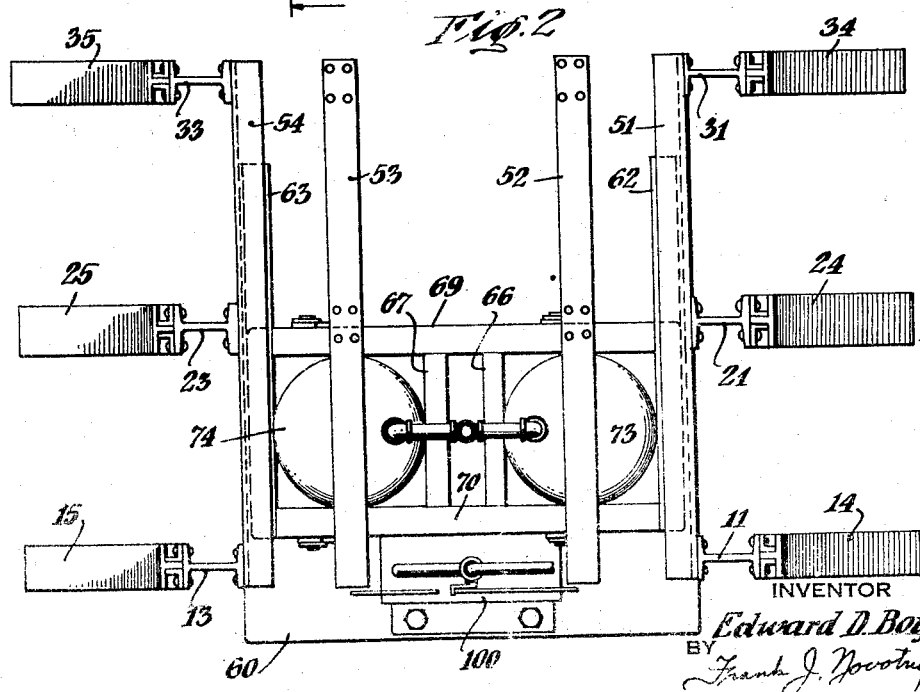

Patented July 14, 1936

2,047,356

UNITED STATES PATENT OFFICE 2,047,356

APPARATUS FOR MOLDING MATERIAL

Edward D. Boyle, New York, N. Y.

Application August 9, 1933, Serial No. 684,378

1 Claim. (Cl. 25—41)

This invention relates to means for and a method of molding granular mixtures, and more especially to an apparatus and method for molding a granular mix in a specially jolted mold.

It is well known that in the manufacture of cast stone from concrete mixes the density of the cast stone is not uniform even when wet pouring methods or methods involving vibrating of the molds are resorted to in order to increase the density of the finished product.

The usual method of casting, namely, sand casting, is not adaptable to pneumatic ramming or even to hand ramming, as the soft sand mold gives or breaks at the slightest pressure. Furthermore, sand molds absorb considerable water from the outside or surface areas only, leaving the center of the mold in a highly liquid form. This again leads to a non-uniform casting. These defects are not noticeable at first, but upon exposure to varying weather conditions, cracks and other defects caused by strains in the cast appear in the product. Even the use of a semi-dry mix, which is the best mix because of the small amount of water present, does not alleviate conditions, unless it is used together with apparatus of the kind herein described and together with the method herein described.

Furthermore, if a wet mix is used such as is commonly used in the sand casting of concrete blocks, no considerable pressure can be applied to further compress the concrete block after the surplus water is absorbed by the sand mold, thus leaving only the necessary water for the crystallization of the cement and leaving the mass in a honeycombed condition. If it were possible at this time to apply pressure, then we would have a dense uniform mass. But it is impossible to do this in a sand mold. With the apparatus described below, this is possible because of the rigid porous mold and the combined pressure and jolting used. It is well known that the absorption of the water of crystallization leaves minute voids or air pockets in the cast block. Furthermore, the casting of a highly liquid or wet mix has been found to produce a very weak product because of the originally weak or unsaturated solution of cement used.

Applicant's method and means for producing molds of granular mixtures utilizes a rigid metal mold having holes drilled therein, the mold being metal but lined with a fine wire screen meshwork upon which is spread a heavy canvas cloth into which the semi-dry mix is poured. In order to increase the density of the concrete mix a horizontal jolting action is used together with the vertical application of a very high pressure. The vertical application of pressure serves to squeeze off all the excess water and air while the canvas lining retains the mix in the mold, and when pressure is released from the mold there is no elasticity of compressed imprisoned air or water to cause the solid mass to distort from its already compressed condition.

The mold is first filled with the right quantity of material, the quantity being determined by weight or measure so that the unit, when pressed to the required density, will be the required size. Next, the hydraulic member is put in place above the mix and the water or oil under very high pressure is admitted to the cylinders of the hydraulic press. Simultaneously, the mold is jolted by a special pneumatic cylinder and piston member and this jolting is continued until there is no further increase in the density of the mix and the excess water has been completely expelled. The operation of the combined pressure, jolting and removal of excess water produces an extremely condensed mix in which practically all of the air and excess water is displaced from between the particles of the cement mix.

The resultant increased density of the product greatly improves the capacity of the cast mix to withstand various destructive influences of weather, wear and tear, pressure and the like, to which it may be subjected in service. For purposes of comparison, it has been found that the product made in accordance with my method and apparatus withstands strains two to three times as great as those of the ordinary sand cast product.

One modification of means for carrying out the above described method of casting the concrete or cement mix is disclosed in the drawings made a part of this description. In these drawings, corresponding parts are similarly numbered in all the drawings.

In the drawings, Figure 1 is a sectional view of a pneumatic device embodying my invention, and taken along the line 1—1 of Figure 3.

Figure 2 is a horizontal top plan view of the same device taken on the line 2—2 of Figure 1.

Figure 3 is a sectional view of the device shown in Figure 1 taken along the line 3—3.

Figure 4 is a view somewhat similar to that of Figure 1, but showing the cylinders in plan view and the mold with its concrete or cement mix in cross-sectional view taken along the line 4—4 of Figure 3.

Figure 5 is a detailed cross-sectional view of the die plates showing the suspending means 82 and the rollers 83 between the plates 80 and 81.

Figure 6 is an enlarged detailed sectional view of the right hand corner of the mold 90 shown in its entirety in Figure 4.

Referring now, more particularly to the embodiments shown in the respective figures, the device comprises girders or I-beams 11, 13, 21, 22, 23, and 31, 32, 33, the last six of which are arranged in the form of two inverted U frames, all the girders being held together by cross members 49, 50, 51, 52, 53, 54, 56 and all being strengthened by pairs of struts 14, 15, 24, 25, 34, 35 respectively. The U frames are in turn attached to base plate 60 thereby being formed into an extremely rigid framework for the pneumatic pressing mechanism described below.

The cylinders 73 and 74 of the pneumatic pressing mechanism are also very rigidly mounted and bolted in a slidable framework made up of channel irons 61 to 68, members 61 to 64 of which are somewhat longer than members 65 to 68 and are slidably supported by cross members 49, 50, 55 and 56 respectively. Cross pieces 69 to 72 are used to join the channel irons 61 to 68 together as well as to rigidly support the cylinders 73 and 74. Highly compressed air, or water or oil under very high pressure is admitted to the cylinders 73 and 74 through pipe 75. The compressed air causes cylinders to become filled with air under pressure and the pistons 76, 77 to be forced downward which in turn causes the connecting rods 78, 79 to force the plate 80 and its slidably associated die plate 81 down upon the concrete or cement mix 85 in the mold 90. Die plate 81 may be movably mounted on the plate 80 by means of the suspension provided by angle iron and 82 and rollers 83 held in grooves between plates 80 and 81. Mold 90 may be similarly slidably mounted on base plate 60 by means of rollers 84.

The vibrator 100, has a casing fixedly mounted to the base 60 and is operated on the principle common to all vibrators, namely, of supplying air or steam to the casing and controlling the entrance and exit port for the air or steam by means of a reciprocating piston. Such types of vibrators are well known in the art, and it is therefore believed unnecessary to enter into a detailed description of the control for the vibrator.

The obvious operation that it is necessary for the vibrator to impart is a very rapid succession, or a series of blows or jolts to the mold 90. This vibration is in turn imparted to the cement mix which is thereby caused to become more dense and more solidified.

For the purpose of explaining why this product is much stronger than the product cast in the ordinary and customary manner now used, the following line of reasoning may be advanced, although the validity of the reasons in no way is to affect the invention. The horizontal jolting, combined with the vertical pressure causes laminations of the article perpendicular to the direction of greatest pressure. The article produced, notwithstanding, is greatly improved by being made with my apparatus and in accordance with my method.

The mold 90 as well as the die plate 81 has a number of perforations 91 in the walls and sides thereof. These perforations, if left uncovered, would allow the cement mix to pass through. To overcome this, the mold 90 is lined, first with a wire screen 92 (Figure 6) over which in turn is placed a canvas lining or bag 93 into which the cement mix is poured.

In order to operate this apparatus, the pneumatic pressing mechanism is slid back so that the plates 80 and 81 leave the mold open at the top. The wet or semi-dry mix is then poured into the mold which is lined with the wire screen canvas material.

Then the pneumatic pressing mechanism is slid back to a position such that die plate 81 is directly over the opening in the mold. The wire mesh canvas material, if not already in the place on the lower side of the die plate 81, is spread over the cement mix with the canvas side in contact with the cement mix. Compressed air is then admitted to the cylinders 73 and 74 and the pressure is increased. In the meantime, the die plate 81 is inserted into the upper opening of the mold 90 and the vibrator 100 is switched into operation causing a jarring of the mold 90. This combined jarring and pressure is continued as above described until the mix 85 is consolidated and solidified.

Although the above description has been given with more particularity to cement mixes, it may, obviously, be applied to the consolidation of other mixes, such as tar, abrasives, carbon, glue, etc., mixes.

What is claimed is:

In a machine for molding a cement mix, the combination of a base plate, an inverted vertical U-shaped frame having arms between which the base plate is fixed, a mold slidably mounted on the base plate, additional means comprising a reciprocating air hammer for shaking the mould horizontally, a die for compressing the cement mix in the mold, and a hydraulic compression member having its cylinder walls restrained by the base of said U-shaped frame and its piston slidably pressed against said die, whereby a constant vertical pressure is exerted on the mold which is at the same time moved in a plane perpendicular to the vertical pressure, said mold having openings porous to air and water in the cement mix.

EDWARD D. BOYLE.